United States Patent
Choi et al.

(12) 
(10) Patent No.: US 6,379,509 B2
(45) Date of Patent: *Apr. 30, 2002

(54) PROCESS FOR FORMING ELECTRODES

(75) Inventors: Hyung-Chul Choi, Lexington; Yi Zhu Chu, Wellesley; Linda S. Heath, Acton; William K. Smyth, Sudbury, all of MA (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 14 days.

(21) Appl. No.: 09/009,391

(22) Filed: Jan. 20, 1998

(51) Int. Cl.$^7$ ................................................ C23C 14/34
(52) U.S. Cl. ............................ 204/192.29; 204/192.15
(58) Field of Search ...................... 204/192.29, 192.12, 204/192.15, 192.3; 427/126.1, 126.3, 162, 164, 166; 357/30

(56) References Cited

U.S. PATENT DOCUMENTS

| | | | |
|---|---|---|---|
| 4,234,654 A | 11/1980 | Yatabe et al. | 428/333 |
| 4,320,169 A | 3/1982 | Yatabe et al. | 428/333 |
| 4,386,130 A | 5/1983 | Hayashi et al. | 428/215 |
| 4,449,125 A | 5/1984 | Clerc et al. | 340/752 |
| 4,465,736 A | 8/1984 | Nishihara et al. | 428/332 |
| 4,740,782 A | 4/1988 | Aoki et al. | 340/719 |
| 4,815,079 A | 3/1989 | Snitzer et al. | 372/6 |
| 4,931,158 A | 6/1990 | Bunshah et al. | 204/192.29 |
| 5,034,795 A * | 7/1991 | Henry | 357/30 |
| 5,105,291 A * | 4/1992 | Matsumoto et al. | 204/192.29 |

(List continued on next page.)

FOREIGN PATENT DOCUMENTS

| | | | |
|---|---|---|---|
| EP | 0 733 931 | * | 9/1996 |
| JP | 02 037 326 | * | 2/1990 |
| JP | 09 171 188 | * | 6/1997 |
| WO | WO 9009730 | | 8/1990 |

OTHER PUBLICATIONS

International Search Report for PCT/US99/01133, Jul. 1999.*

Patent Abstract of Japan JP 09 152 618 A, Oct. 1997.*

Cochrane et al., Proc SPIE, 2017, 68–74 (1993) (Abstract only).

Gibbons et al., Vacuum Coaters 40th Ann. Tech. Conf. Proc., 216–220 (1997).

Hara et al., IDW'97, 399–492 (1997).

Patel et al., Soc. Vacuum Coaters 39th Ann. Tech. Conf. Proc., 441–445 (1996).

Rottman et al., Proc. SPIE, 2255, 628–638 (1994) (Abstract only).

*Primary Examiner*—Nam Nguyen
*Assistant Examiner*—Gregg Cantelmo
(74) *Attorney, Agent, or Firm*—Kirkpatrick & Lockhart LLP

(57) ABSTRACT

Substantially transparent electrodes are formed upon a substrate by forming on the substrate, in order, a high index layer, a metallic conductive layer, and a conductive or semi-conductive top layer; and patterning the top layer and the conductive layer, preferably by laser ablation, to form a plurality of discrete electrodes from the metallic conductive layer. Conductors can be attached directly to the top layer, without requiring removal of this layer to expose the metallic conductive layer. The high index layer, conductive layer and top layer can all be formed by sputtering or similar processes which do not require high temperatures, so that plastic substrates can be used. The electrodes can be used, for example, in flat panel displays and in touch screen displays.

13 Claims, 3 Drawing Sheets

U.S. PATENT DOCUMENTS

| | | | |
|---|---|---|---|
| 5,118,538 A | | 6/1992 | Escher et al. .................. 428/1 |
| 5,223,687 A | * | 6/1993 | Yuasa et al. ................... 219/68 |
| 5,268,978 A | | 12/1993 | Po et al. ........................ 385/33 |
| 5,343,216 A | | 8/1994 | Katayama et al. ............ 345/92 |
| 5,373,576 A | | 12/1994 | Minns et al. ............... 385/125 |
| 5,418,880 A | | 5/1995 | Lewis et al. ................ 385/123 |
| 5,512,148 A | * | 4/1996 | Smith, Jr. et al. ....... 204/192.15 |
| 5,514,618 A | * | 5/1996 | Hunter, Jr. et al. ........... 437/60 |
| 5,538,905 A | * | 7/1996 | Nishioka et al. ....... 204/192.29 |
| 5,561,440 A | | 10/1996 | Kitajima et al. ............... 345/87 |
| 5,597,626 A | | 1/1997 | Eguchi .......................... 428/1 |
| 5,652,158 A | | 7/1997 | Bae ...................... 437/40 TFT |
| 5,702,565 A | * | 12/1997 | Wu et al. ...................... 216/65 |
| 5,726,524 A | * | 3/1998 | Debe ....................... 204/192.1 |

PROCESS FOR FORMING ELECTRODES

BACKGROUND OF THE INVENTION

This invention relates to a process for forming electrodes, to an electrode assembly produced by this process, and to a liquid crystal display and touch screen display incorporating such an electrode assembly.

Liquid crystal displays comprise a liquid crystal material sandwiched between two substantially transparent electrode assemblies. Touch screen displays of either the resistive or capacitive types comprise a display screen (for example, a cathode ray tube) having superposed thereover two substantially transparent electrode assemblies. In both types of displays, each of these electrode assemblies typically comprises a substrate on which is deposited a conductive layer thin enough to be substantially transparent. (The term "substantially transparent" is used herein to mean that the electrodes transmit sufficient visible light so that the two superposed electrodes will not substantially obscure, nor substantially distort the color of, a liquid crystal display or touch screen display incorporating the two electrodes. Typically, commercial specifications require that the two superposed electrodes have a transmittance of at least 80% at 550 nm.) In liquid crystal displays the substrate is usually glass, whereas touch screen displays usually employ a synthetic resin (plastic) substrate for at least one electrode. The conductor is often formed from indium tin oxide or a similar metal oxide. The conductor is typically formed by depositing the oxide by sputtering or chemical vapor deposition at a high temperature, and then annealing, also at a high temperature. On glass substrates temperatures in excess of 300° C. may be used to deposit and anneal the conductor; on plastic substrates, lower temperatures must be used, with resultant higher electrical resistance in the conductor.

Alternatively, both liquid crystal displays and touch screen displays may make use of thin film electrodes comprising a metallic conductive layer sandwiched between two layers having high refractive indices; these two layers usually being formed from metal oxides. The metallic conductive layer is patterned so as to divide it into a plurality of electrodes, and conductors are attached to each of these electrodes to enable formation of the desired patterns in the liquid crystal material. Hitherto, it has usually been necessary to eliminate the high index layer remote from the substrate at the points where the conductors are attached to the electrodes, since otherwise this high index layer might present too great a resistance to current flow between the conductors and the electrodes.

Several types of processes are known for forming these thin film electrode assemblies. If high resistance can be tolerated, one can simply leave the top high index layer intact, and place the contacts thereon. Alternatively, the conductors can be provided with conductive spacers and applied under pressure to the high index layer so that the spacers punch through the high index layer and contact the electrodes. However, this process tends to be unsatisfactory because the electrical contact between the conductors and the electrodes via the spaces is not closely reproducible from one electrode assembly to the next, and hence the yield of the process is adversely affected. In a further type of process, one high index layer and the metallic conductive layer are deposited upon the substrate, and the metallic conductive layer is patterned to form the electrodes. A mask is then applied to cover the areas where the conductors are to be attached to the electrodes, and the second high index layer is deposited; the mask prevents this high index layer being applied to the points where the conductors are to be attached, since the presence of the "upper" high index layer at these points would cause too high a resistance between the electrodes and the conductors. This procedure is time-consuming and costly because of the two separate deposition steps. Also, the conductive layer is exposed to air before the upper high index layer is applied, and with certain types of conductive layer, this may pose a problem because the conductive layer may oxidize in air.

In yet another type of process, all three layers are deposited in a single operation, the upper high index layer and the conductive layer are patterned to form the electrodes, and then the portions of the upper high index layer, lying in areas where the conductors are to be attached to the electrodes, are removed. This type of process only requires a single deposition operation and does avoid any risk of oxidation of conductive layer by exposure to air. However, the selective removal of the necessary portions of the upper high index layer is difficult.

Moreover, many prior art processes for forming electrodes require the use of elevated temperatures of 200° C. or more, which in practice requires the use of glass substrates or expensive high temperature plastics (polymers are known which have glass transition temperatures above 225° C. and can thus withstand processing at such temperatures). There are many applications for liquid crystal displays (for example, in cellular telephones and other mobile electronic devices) where it would be advantageous to use less expensive plastic substrates having lower glass transition temperatures if thin film electrodes could be formed on such substrates.

The present invention provides a process for forming electrodes on a substrate which requires only a single deposition operation and which does not require selective removal of the top high index layer. Preferred forms of this process permit the use of relatively inexpensive plastic substrates.

SUMMARY OF THE INVENTION

Accordingly, this invention provides a process for forming a plurality of substantially transparent electrodes upon a substrate. This process comprises forming on the substrate, in order, a high index layer, a metallic conductive layer, and a top high index layer having a conductivity of at least about 400 ohms/square and patterning the top layer and the conductive layer to form a plurality of discrete electrodes from the metallic conductive layer.

This invention also provides a substantially transparent electrode assembly comprising: a substrate; a high index layer formed on the substrate; a metallic conductive layer formed on the high index layer; and a high index top layer having a conductivity of at least about 400 ohms/square formed on the conductive layer, at least the top layer and the conductive layer being patterned so as to divide the conductive layer into a plurality of discrete electrodes.

This invention extends to a liquid crystal display assembly comprising a liquid crystal material sandwiched between two electrode assemblies, at least one of these electrode assemblies being an electrode assembly of the invention, as described above.

Finally, this invention extends to a touch screen display apparatus comprising a display screen having superposed thereover two electrode assemblies, at least one of the electrode assemblies being an electrode assembly of the invention, as described above.

DETAILED DESCRIPTION OF THE INVENTION

Figure 1:
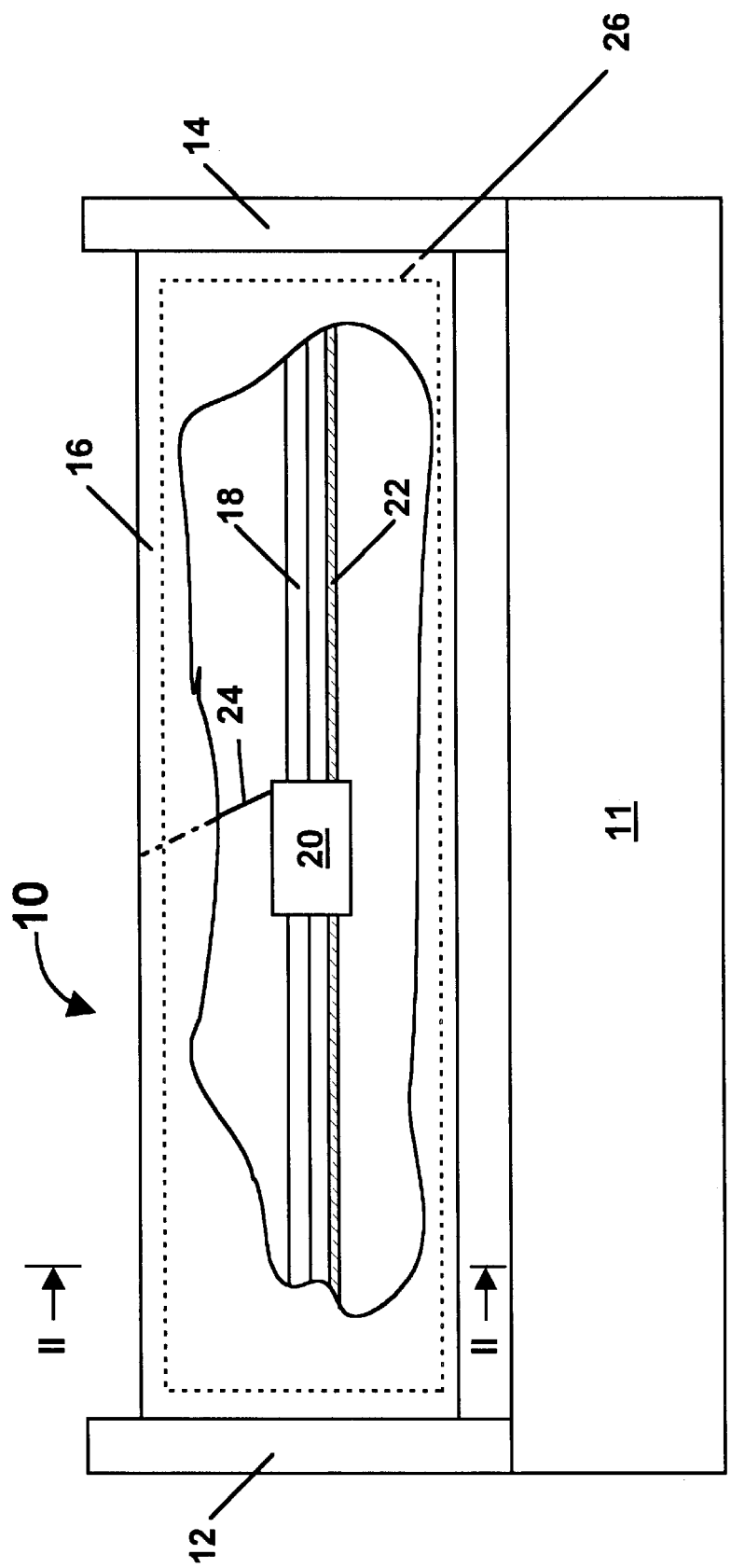
FIG. 1 is a schematic side elevation of a preferred apparatus for carrying out the process of the invention.

The substrate used in the present process may be formed of any material having sufficient mechanical integrity and a surface smooth enough to permit the formation of electrodes thereon. The substrate must, like the other layers of the electrode assembly be sufficiently transparent to allow its use in a liquid crystal display. Glass substrates may be used, but it is generally preferred that the substrate be formed from a synthetic resin. Preferred resins for this purpose include polycarbonate and poly(bis(cyclopentadiene) condensate)s, such as the material sold by Lonza AG, M ünchensteinerstrasse 38, CH-4002 Basel, Switzerland under the trademark "TRANSPHAN". This material is a film of a polymer sold by Japan Synthetic Rubber Co. Ltd., 2-11-24 Tsukiji, Tokyo 104, Japan under the trademark "ARTON"; this polymer is stated by the manufacturer to be of the formula:

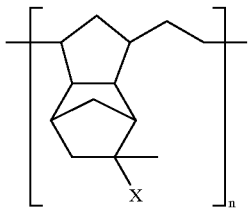

(in which X is a polar group). Other substrates which may be useful in the present invention include polyether sulfones and poly(alkyl)acrylates.

The substrate may be provided with coatings on one or both surfaces to act as gas and moisture barriers, and/or to improve the hardness and scratch resistance of the substrate and/or to improve the adhesion of the high index layer to the substrate. For example, it has been useful to provide on one surface or both surfaces of the substrate a coating of a hard polymer. Such a hard coating will typically have a thickness of from about 1 to about 15 μm, preferably from about 2 to about 4 μm and may be provided by free radical polymerization (initiated either thermally or by ultra-violet radiation) of an appropriate polymerization material. An especially preferred hard coating is the acrylic coating sold under the trademark "TERRAPIN" by Tekra Corporation, 6700 West Lincoln Avenue, New Berlin, Wis. 53151. It is also useful to provide on one surface of the substrate a thin (typically 10–30 nm) layer of silica ($SiO_x$) to act as a gas and moisture barrier for the eventual liquid crystal display assembly, and to act as an adhesion promoter to improve the adhesion of the high index layer. When both a hard coating and a silica layer are provided on the substrate, they may be provided in either order. (The term "silica" is used herein in accordance with its normal meaning in the art to mean a material of the formula $SiO_x$ where x is not necessarily equal to two. As those skilled in the art are aware, such silica layers are often deposited by chemical vapor deposition or sputtering of silicon in an oxygen atmosphere, so that the material deposited does not precisely conform to the stoichiometric formula $SiO_2$ of pure silica.)

In the present process, there are deposited on the substrate, in order, a high index layer, a metallic conductive layer and a high index top layer. Although other techniques, for example e-beam and thermal evaporation may be employed to deposit these layers, the layers are preferably deposited by sputtering or by chemical vapor deposition, with dc sputtering being especially preferred, although RF, magnetron and reactive sputtering and low-pressure, plasma-enhanced and laser-enhanced chemical vapor deposition may also be used. When the preferred plastic substrates are used, the deposition of each of the three layers should be effected at a temperature not greater than about 170° C. in order to prevent damage to the plastic substrate; the temperature limit of course varies with the exact substrate employed and in the case of the aforementioned TRANSPHAN substrate, this temperature should not be greater than 160–165° C.

The high index layer adjacent the substrate may be electrically insulating or conductive, though the latter is generally preferred, since the use of an insulating high index layer ensures that, should any portion of this high index layer remain between adjacent electrodes after the patterning step, this remaining portion will not cause an electrical short between the electrodes; the presence of such a short is of course undesirable, since it in effect turns the two adjacent electrodes into a single electrode and thereby adversely affects the quality of a liquid crystal display or touch screen in which the electrode assembly is used. However, a conductive high index layer may be used where the patterning conditions are such that one can be certain that no portion of the high index layer will remain after patterning.

Whether insulating or conductive, the high index layer is typically formed from a metal oxide, preferred oxides for this purpose being indium oxide ($In_2O_3$), titanium dioxide ($TiO_2$), cadmium oxide (CdO), gallium indium oxide, niobium pentoxide ($Nb_2O_5$), indium tin oxide and tin dioxide ($SnO_2$). As is well known to those skilled in the art of forming electrodes for liquid crystal display assemblies (see, for example, Patel et al., Methods of monitoring and control of reactive ITO deposition process on flexible substrates with DC sputtering, Society of Vacuum Coaters 39th Annual Technical Conference Proceedings, 441–45 (1996), and Gibbons et al., ITO Coatings for display applications, Society of Vacuum Coaters 40th Annual Technical Conference Proceedings, 216–220 (1997)), the conductivity of such metal oxide layers can be controlled over several orders of magnitude by varying the conditions under which the oxide layer is deposited. For the preferred dc sputtering deposition process, the relevant conditions include temperature, reactor pressure, partial pressure of oxygen, dc bias and deposition rate. Doping may also be used to control the conductivity of the insulating layer. Typically, the thickness of the insulating layer will be in the range of from about 20 to about 80 nm.

The refractive index needed in the high index layer adjacent the substrate (and in the top high index layer) will vary somewhat depending upon the other layers present in the final apparatus in which the electrode assembly of the present invention is to be incorporated. In general, the refractive index of the high index layers, measured at 550 nm, will exceed 1.6, and the refractive indices of the preferred metal oxide high index layers can readily be made to exceed 1.9, as described in the papers mentioned above.

The conductive layer may be formed from any metal or metal alloy capable of being deposited by the deposition process employed and having sufficient conductivity to provide the required low resistance in the final electrode assembly. Preferably, the conductive layer comprises at least one of gold, silver and a gold/silver alloy (for example, the alloy described in U.S. Pat. No. 4,234,654). Since gold improves the corrosion resistance of the conductive layer, it is in general desirable that this layer comprise a layer of silver coated on one or both sides with a thinner layer of gold. For example, a 10 nm layer of silver sandwiched between two 1 nm layers of gold has been found to give good results. The overall thickness of the conductive layer will typically be in the range of about 5 to about 20 nm.

The preferred materials and processes for forming the top layer are the same as those for forming the insulating layer, except of course that the conditions used to deposit the top layer should be varied so as to give the top layer substantial conductivity. As is well known to those skilled in the art, the resistance of layers used in electrode assemblies is normally measured over the whole surface of the assembly, and in the present case it has been found that using a top layer with a conductivity of at least about 400 ohms/square, and desirably from about 100 to about 200 ohms per square, gives satisfactory results. The thickness of the top layer is desirably in the range of about 20 to about 100 nm.

Examples of combinations of insulating layers, conductive layers and top layers which have been found to give good results in the present process are given in Table 1 below (in which "ITO" stands for indium tin oxide).

TABLE 1

| Insulating layer | Conductive Layer | Top Layer |
| --- | --- | --- |
| ITO, 40 nm | Ag, 10 nm | ITO, 47 nm |
| ITO, 40–42 nm | Ag, 9–10 nm/Au, 1–1.5 nm | ITO, 47 nm |
| ITO, 40–42 nm | Au, 1 nm/Ag, 10 nm/ Au 1 nm | ITO, 47 nm |
| SnO$_2$, 42 nm | Ag,10–12 nm | ITO, 47 nm |
| SnO$_2$, 42 nm | Ag, 9–10 nm/Au, 1–1.5 nm | ITO, 47 nm |
| SnO$_2$, 42 nm | Au, 1 nm/Ag, 10 nm/ Au 1 nm | ITO, 47 nm |

Following the deposition of the insulating, conductive and top layers, the top layer and the conductive layer are patterned to form a plurality of discrete electrodes from the conductive layer. It is important that the patterning extend completely through both the top layer and the conductive layer to ensure that there are no short circuits between adjacent electrodes formed from the conductive layer. In practice, the patterning will usually extend completely through the high index layer adjacent the substrate; however, as already indicated, it is desirably essential that the high index layer have sufficient resistance to prevent unwanted current leakage between adjacent electrodes should any portion of the high index layer remain after patterning.

The preferred technique for patterning is laser ablation, desirably using an infra-red laser emitting in the range of about 700 to about 1200 nm; the infra-red radiation is absorbed primarily within the conductive layer leading to rapid and reliable patterning of this layer. Desirably, the laser used for the laser ablation is a fiber laser employing a double-clad optic fiber, as described for example in U.S. Pat. Nos. 4,815,079; 5,268,978; 5,373,576 and 5,418,880. Typically, the energy required for patterning the electrode assembly is about 800 mJ cm$^{-2}$, so that using a fiber laser with a 6 W output and an 8.5 $\mu$m spot radius (measured on a 1/e$^2$ basis) permits scanning the spot over the substrate at about 70 m sec$^{-1}$, and patterns approximately 400 cm$^2$ per minute of the substrate. As described in more detail below with reference to the drawings, typically the laser beam is scanned in a raster pattern over the substrate while being modulated under the control of digital signals from a raster image processor. This technique has the advantage that it requires only the preparation of a digital image of the proposed electrode pattern, so that the apparatus can change patterns with essentially no down time.

After laser ablation, the electrode assembly is contaminated with redeposited debris from the ablation and surface residue. It has been found that the surface of the assembly can be effectively cleaned by washing it with water, desirably containing a surface active agent; gentle scrubbing of the surface assists in the cleaning process without harming the final electrode assembly.

After this cleaning process, a plurality of conductors are attached to portions of the top layer overlying the discrete electrodes formed during the patterning step, so that these conductors make electrical contact with the electrodes via the conductive top layer. The electrode assembly thus formed may be for use in a passive type liquid crystal display, a touch screen display or other flat panel display.

It has been found that the electrode assemblies of the present invention can readily be formed having greater than 80% transparency at 550 nm, and less than 10 ohms per square sheet resistance. Such electrode assemblies are readily incorporated into liquid crystal display assemblies of commercial quality.

Figure 2:
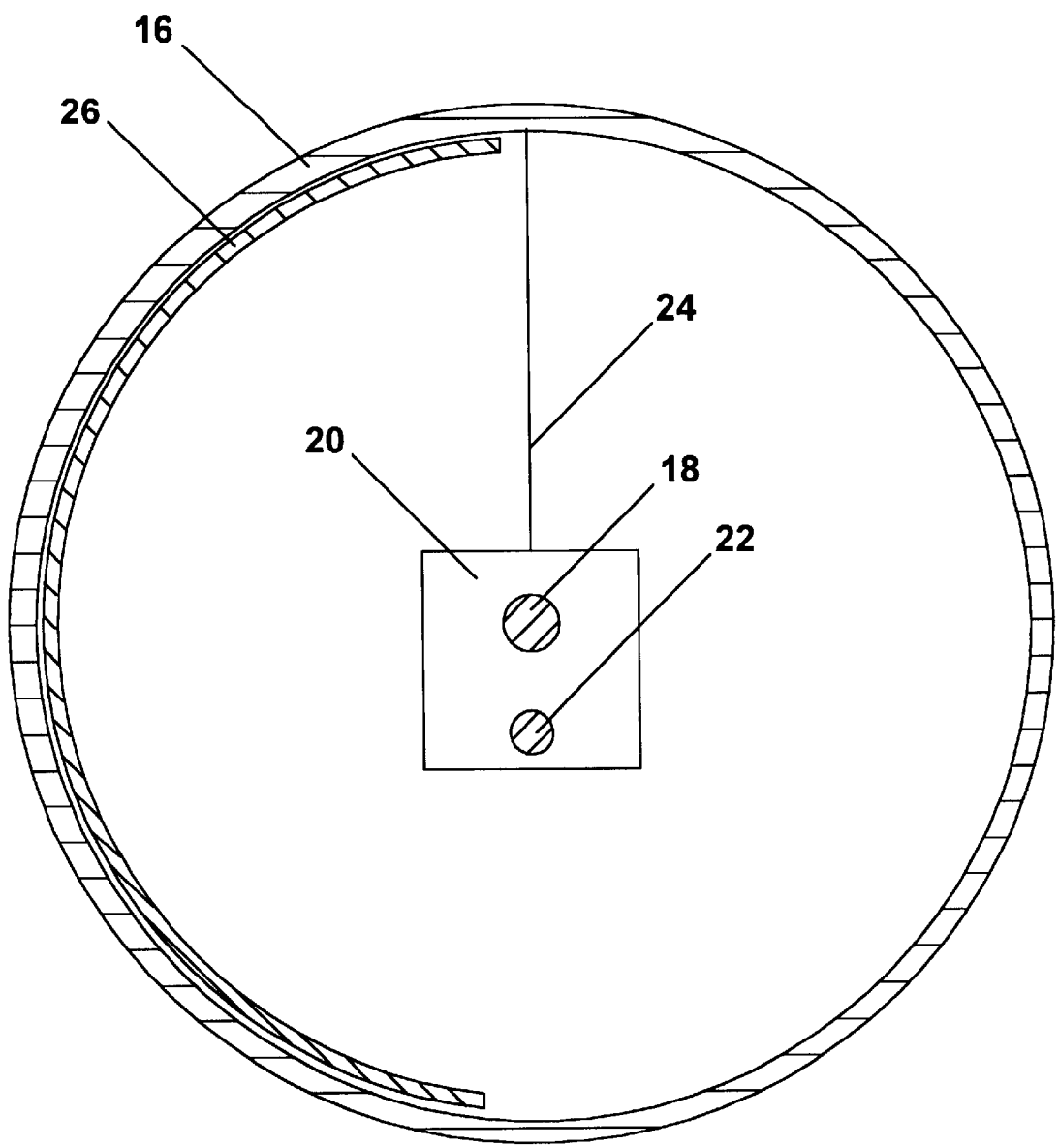
FIG. 2 is a section taken along the line II—II in FIG. 1.

A preferred process of the invention will now be described in more detail, though by way of illustration only, with reference to the accompanying drawings, in which FIGS. 1 and 2 show schematically a preferred apparatus for carrying out the patterning step of the process.

The apparatus (generally designated 10) shown in FIGS. 1 and 2 of the accompanying drawings is an internal drum laser ablation device; alternatively an external drum or flat bed device may be used. The apparatus 10 comprises a base 11 carrying at its opposed ends two upstanding end plates 12 and 14. A cylindrical drum 16 is fixedly mounted between the end plates 12 and 14. (Part of the drum 16 is broken away in FIG. 1 to show the remaining parts of the apparatus 10.) A rod 18 is fixed between the end plates 12 and 14 and a fiber laser unit 20 is slideably mounted on this rod. The laser unit 20 is also engaged with a lead screw 22 which extends below and parallel to the rod 18. The laser unit 20 comprises a laser and a rotating mirror (neither component is shown separately in FIG. 1), which causes the laser beam 24 to emerge from the laser unit at an acute angle (typically about 65°) to the axis of the rod 18 and to rotate rapidly around this axis, thereby directing this beam around the internal surface of the drum 16. During the patterning process, the lead screw 22 is rotated synchronously with the mirror of the laser unit 20 so that, as the beam 24 rotates, the laser unit 20 moves horizontally along the axis of the drum 16, so that the beam 24 describes a helical path along the internal surface of the drum 16. A sheet 26 of coated substrate is held by a vacuum device (not shown) against the internal surface of the drum 16 so that the beam 24 passes in a raster pattern over the sheet 26. The operation of the laser unit 20 is controlled by a computerized control unit (not shown) so as to produce the desired pattern on the sheet 26.

In a preferred process of the invention, a sheet of the aforementioned TRANSPHAN, sold by Lonza AG) 5.5 mil (140 $\mu$m) thick was coated on both surfaces with a 2 to 4 $\mu$m thick layer of acrylic polymer ("TERRAPIN" sold by Tekra Corporation, 6700 West Lincoln Avenue, New Berlin, Wis. 53151) to act as a hard coat to improve the scratch resistance of the final electrode assembly barrier. The front surface of the sheet (i.e., the surface on which the metal oxide and metal layers were to be deposited) was then coated by DC sputtering or chemical vapor deposition with a 30 nm layer of silica, which serves as a gas and moisture barrier in the final liquid crystal display assembly in which the electrode assembly would ultimately be incorporated, and also as an adhesion promoter to enhance the adhesion of the high index layer to the substrate. (The location of the silica layer can be varied, depending partly upon the type of substrate employed. For example, if the silica layer does not need to function as an adhesion promoter, but only a gas and moisture barrier, the layer may be provided on the rear surface of the substrate (i.e., the surface opposite to that on which the metal oxide and metal layers were to be deposited) or between one of the hard coats and the substrate. Locating the silica layer immediately below the high index layer does have the disadvantage that some or all of the silica layer may be removed during the patterning step, which might affect the gas and moisture barrier function of the layer.)

A 42 nm layer of tin dioxide was then deposited on the front surface of the sheet by direct current sputtering using an industrial metallizer apparatus. Thereafter, a 1 nm layer of gold, a 10 nm layer of silver and a further 1 nm of gold were deposited on top of the insulating layer by direct current sputtering using the same apparatus to form the metallic conductive layer of the electrode assembly. Finally, a 47 nm layer of indium tin oxide was deposited on top of the metallic conductive layer by direct current sputtering using the same apparatus to form the top layer of the electrode assembly.

Figure 3:
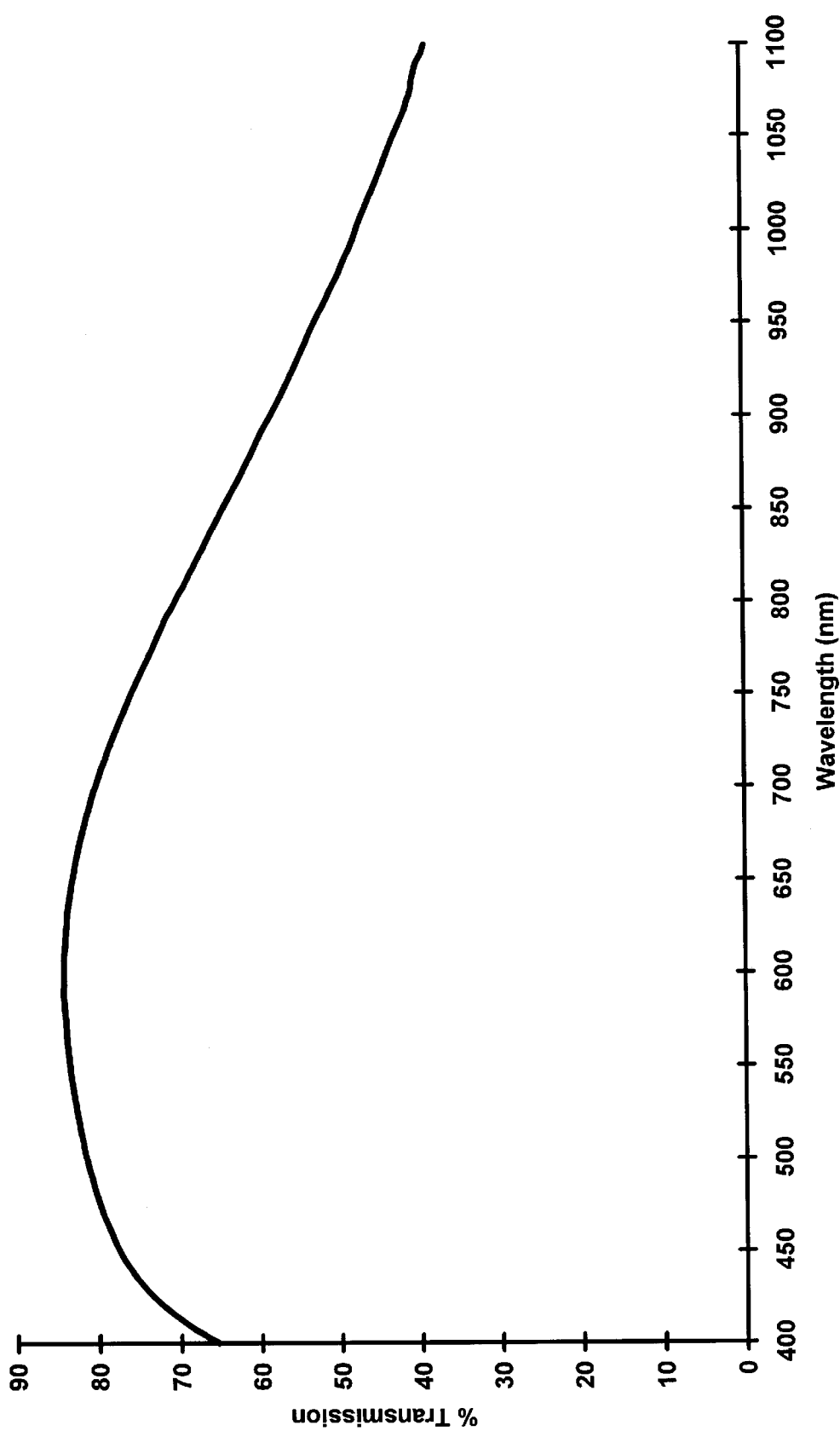
FIG. 3 shows the visible and near infra-red transmission spectrum of a preferred electrode assembly of the present invention produced using the apparatus shown in FIGS. 1 and 2.

The coated sheet thus produced was patterned using the apparatus shown in FIGS. 1 and 2. The laser unit was a 9 W fiber laser unit (Model FL9000-T, available from Polaroid Corporation, Cambridge, Mass.) operating in the $TEM_{00}$ spatial mode at a wavelength of 1.1 μm and a spot radius of 8.5 μm (measured on a $1/e^2$ basis), the beam of the apparatus being rotated so that the spot traversed the coated sheet at a linear velocity of 70 m $sec^{-1}$. FIG. 3 shows the visible and infra-red absorption spectrum of the coated substrate immediately prior to patterning. It is important that the high index, top high index and especially the conductive layers be chosen to provide high transparency in the visible region (so that the resultant electrode assembly is sufficiently transparent) while still providing enough absorption at the infra-red wavelength used for patterning; the metal layer described above gives good infra-red absorption without undue visible absorption.

Following this patterning step, the patterned sheet was washed with water containing a detergent, with gentle manual scrubbing, to remove debris from the patterning step, and to produce a final sheet ready for incorporation into a liquid crystal display assembly.

What is claimed is:

1. A process for forming a plurality of substantially transparent electrodes upon a substrate, the process comprising:

forming on the substrate, in order, a bottom high index layer, a metallic conductive layer comprising a layer of silver coated with a layer of gold that is thinner than the layer of silver, and a top high index layer, said top high index layer having a conductivity of at least about 400 ohms/square and patterning the top high index layer and the conductive layer to form a plurality of discrete electrodes from the metallic conductive layer.

2. A process according to claim 1 further comprising connecting a plurality of conductors to portions of the top high index layer overlying the discrete electrodes.

3. A process according to claim 1 wherein the substrate comprises a synthetic resin.

4. A process according to claim 1 wherein the bottom high index layer is an electrically insulating layer.

5. A process according to claim 1 wherein the bottom high index layer comprises at least one of indium oxide, titanium dioxide, cadmium oxide, gallium indium oxide, niobium pentoxide, indium tin oxide and tin dioxide.

6. A process according to claim 1 wherein the bottom high index layer is formed by sputtering.

7. A process according to claim 3 wherein the bottom high index layer is formed at a temperature not greater than about 170° C.

8. A process according to claim 1 wherein the conductive layer is formed by sputtering.

9. A process according to claim 3 wherein the conductive layer is formed at a temperature not greater than about 170° C.

10. A process according to claim 1 wherein the top high index layer comprises at least one of indium oxide, titanium dioxide, cadmium oxide, gallium indium oxide, niobium pentoxide, indium tin oxide and tin dioxide.

11. A process according to claim 1 wherein the top high index layer is formed by sputtering.

12. A process according to claim 3 wherein the top high index layer is formed at a temperature not greater than about 170° C.

13. A process according to claim 1 wherein the thickness of the layer of gold is from about 1 nm to about 1.5 nm.

* * * * *